United States Patent [19]

Nakaya et al.

[11] Patent Number: 5,231,523
[45] Date of Patent: Jul. 27, 1993

[54] LIQUID CRYSTAL ELEMENTS AND CONDUCTIVE ORGANIC COMPOUND FILM-FORMING COMPOSITIONS

[75] Inventors: Kenji Nakaya, Ichikawa; Shunsuke Kobayashi, Tokyo; Hitoshi Suenaga, Itami; Makoto Ebisawa, Shibukawa, all of Japan

[73] Assignees: TDK Corporation; Shunsuke Kobayashi, both of Tokyo; Teikoku Chemical Industry, Co., Ltd., Osaka; Japan Carlit Co., Ltd., Tokyo, all of Japan

[21] Appl. No.: 930,465

[22] Filed: Aug. 20, 1992

Related U.S. Application Data

[63] Continuation of Ser. No. 388,080, Aug. 1, 1989, abandoned.

[30] Foreign Application Priority Data

Aug. 3, 1988 [JP] Japan ............... 63-194225
Aug. 17, 1988 [JP] Japan ............... 63-204250
Sep. 27, 1988 [JP] Japan ............... 63-241275

[51] Int. Cl.$^5$ ............................ G02F 1/13
[52] U.S. Cl. ...................... 359/56; 359/75; 359/87
[58] Field of Search ............ 350/336, 339 F; 357/8; 359/75, 77, 78, 56, 87

[56] References Cited

U.S. PATENT DOCUMENTS 4,721,367 1/1988 Yoshinaga et al. ............ 350/336
4,938,569 7/1990 Tsunoda et al. ............ 350/339 F

FOREIGN PATENT DOCUMENTS 147871 7/1985 European Pat. Off. .
0260152 3/1988 European Pat. Off. ............ 357/8
285564 10/1988 European Pat. Off. .
61-133285 6/1986 Japan .
61-296086 12/1986 Japan .
1-197592 4/1989 Japan .

OTHER PUBLICATIONS

Eurodisplay' 81 published in Sep. 1981, "Liquid Crystal Television Display: Material Consideration" by S. Matsumoto et al.
Applied Physics Letters, vol. 28, No. 9, May 1, 1976, "Improved dc dynamic scattering with redox dopants in ester liquid crystals" reported by Hong Sup Lim, et al.
Journal of the Electrochemical Society, Sep. 1977, "Electrochemical Properties of Dopants and the D-C Dynamic Scattering of a Nematic Liquid Crystal" by H. S. Lim, et al.
Journal of the Physical Society of Japan, vol. 55, No. 4, Apr. 1986.
"Effect of Polarization Field on Elastic Deformation in a 180° Twisted Sample of Chiral Smectic C Liquid Crystal" by Masahiro Nakagawa, et al.
International Symposium Digest of Technical Papers, vol. XVI. "A Multiplexed Ferroelectric LCD Using ac Field-Stabilized States" by J. M. Geary.
Eurodisplay' 84 published in Sep. 1984 "Ferroelectric Optical Switching of Chiral Smectic C Liquid Crystal Mixtures" by J. P. Le Pesant, et al.

(List continued on next page.)

*Primary Examiner*—Andrew J. James
*Assistant Examiner*—Sara W. Crane
*Attorney, Agent, or Firm*—Oblon, Spivak, McClelland, Maier & Neustadt

[57] ABSTRACT

A liquid crystal element has a pair of opposed substrates, electrodes thereon, and a ferroelectric liquid crystal sealed between the substrates. A film of a conductive organic compound or a mixture of a conductive organic compound and another organic compound is disposed on the substrate surface, optionally via an orienting film. The conductive organic compound is typically a charge-transfer complex. The film may be formed by an LB method, coating, vapor phase polymerization or electrolytic polymerization. The element has improved optical bistability, contrast, and response.

10 Claims, 5 Drawing Sheets

OTHER PUBLICATIONS

SID 88 Digest, May 1988, pp. 246–249, SID; J. Dijon et al.: "High-speed SC* mixtures: an evaluation of their performances" *Chapter discussion*.

SID 88 Digest, May 1988, pp. 45–48, SID; H. Ikeno et al.: "LCDs fabricated using langmuir-blodgett polyimide orientation films" *Chapter C: SSFCLD*.

Patent Abstracts of Japan, vol. 12, No. 370 (P-767) [3217], Oct. 5, 1988; & JP-A-63 121 020 (Canon Inc.) May 25, 1988 *Abstract*.

Thin Solid Films, vol. 160, Jun. 1988, pp. 21–32, Elsevier Sequoia, NL; M. Uekita et al.; "Heat-stable aromatic polymer precursors as langmuir-blodgett film materials" *The Whole document*.

Journal of Polymer Science, col. 22, 1984, pp. 1299–1307, John Wiley & Sons, Inc; M. Watanabe et al.: "Synthesis and electrical conductivity of polyamides containing tetrathiafulvalene moieties in the main chain" *Chapter introduction*.

J. Chem. Soc., Chem Commun., No. 11, Jun. 1988, pp. 754–756; J. Richard et al.: "Preparation of new conducting langmuir-blodgett films based on an ethylenedithiodioctadecylthiotetrathiafulvalene charge transfer complex" *The whole document*.

Matsumoto et al.: "Highly conducting langmuir-blodgett films of the TWTTF-CnTCNQ system" *Chapter Introduction*.

1987 SID International Symposium, Digest of Technical Papers, New Orleans, Louisiana, May 12th–14th May 1987, pp. 379–382, Palisades Institute for Research Services, Inc., New York, US; W. J. Latham et al.: "A new class of color filters for liquid-crystal displays" *Chapter: Introduction*.

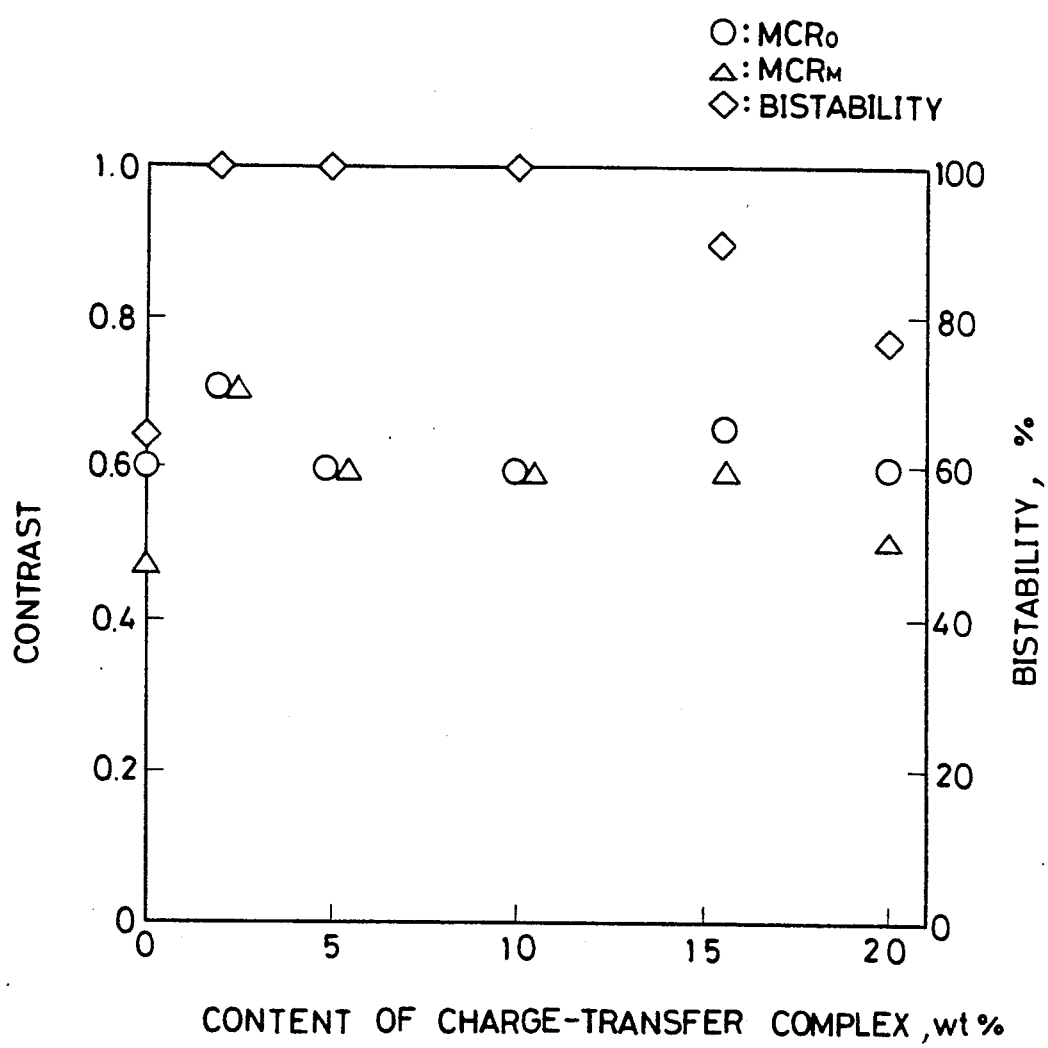
F I G. 1

LIQUID CRYSTAL ELEMENTS AND CONDUCTIVE ORGANIC COMPOUND FILM-FORMING COMPOSITIONS

This application is a continuation of application Ser. No. 07/388,080, filed on Aug. 1, 1989, now abandoned.

This invention relates to improvements in liquid crystal elements using ferroelectric liquid crystal. It also relates to compositions for forming conductive organic compound films adapted for use in such liquid crystal elements.

BACKGROUND OF THE INVENTION

Liquid crystals have effective optical properties which can be controlled by an applied electric field. Non-light-emitting elements utilizing the electrooptic effect of liquid crystal are now widely used.

Among liquid crystals, most attention is now paid to ferroelectric liquid crystals which exhibit ferroelectric properties in a smectic C* phase because of fast response and optical bistability or memory effect. The memory effect of ferroelectric liquid crystal is developed by the bistability of liquid crystal molecular alignment.

A variety of methods have been examined for causing liquid crystal to develop optical bistability, including (1) rubbing, (2) shearing, (3) magnetic field application, (4) imparting appropriate orienting nature to the cell side, (5) temperature gradient, and (6) oblique evaporation. Methods (2) to (5) are difficult to apply to elements having practical surface areas. Method (6) is poor in productivity or mass production because the permissible range of optimum evaporation angle is narrow. Therefore, most efforts have been made on modifications of the rubbing method which has been feasible for conventional liquid crystal elements of the TN type as the most productive orienting method.

Most modified rubbing methods require cells as thin as about 1 micron. From the standpoint of manufacturing process, it is very difficult to form such thin cells with a relatively large surface area. As compared with the contrast developed under an applied electric field, the cell provides a low contrast during memory periods when the electric field is removed. As the cell thickness is increased, the bistability is further deteriorated.

AC stabilization is contemplated as reported by J. P. Le Pesant et al., Paris Liquid Crystal Conf., 1984, p 217 and J. M. Geary, SID '85 Digest, p 128. Although AC stabilization achieves good bistability, the resulting liquid crystal element, which is equivalently represented by a parallel circuit of capacitance C and resistance R, requires a high power, losing the benefits of low voltage drive and low power consumption inherent to liquid crystal elements.

In some cases, the necessary drive voltage exceeds the drive voltage range available with conventional liquid crystal element driving IC's. There arises a need for newly developing a special IC for drive, which will undesirably invite a cost increase.

To overcome these problems, Nakaya and Kobayashi proposed a liquid crystal element having an orienting film in the form of a mono-molecular film or built-up film of an organic high molecular weight compound formed by a Langmuir Blodgett (often abbreviated as LB, hereinafter) process (see Japanese Patent Application No. 58005/1988 filed Mar. 11, 1988). This liquid crystal element has improved bistability due to the presence of the orienting film and maintains the bistability even at increased cell thickness in the practical range.

However, further improvements are required for liquid crystal elements not only in bistability, but also in contrast. In addition, the response time that the liquid crystal element of the above proposal actually exhibited did not reach the theoretically presumed value.

In ferroelectric liquid crystal elements, unlike other liquid crystal elements, the spatial divergence of spontaneous polarization that ferroelectric liquid crystal molecules possess, that is, a polarized field created by the associated space charge affects the alignment of liquid crystal molecules (see M. Nakagawa and T. Akahane, J. Phys. Soc. Jpn., 55, 1516 (1986)).

This will be better understood by considering the switching action of a ferroelectric liquid crystal element.

An applied electric field across a ferroelectric liquid crystal causes reversal of spontaneous polarization. The reversed spontaneous polarization creates polarization charge at the interface between the liquid crystal and the orienting film. The polarization charge inhibits reversal of spontaneous polarization, delaying the response time of the liquid crystal element and lowering the contrast available under the applied electric field.

When the electric field is turned off, the charge created at the interface between the liquid crystal and the orienting film during electric field application starts discharging. With this discharging, the spontaneous polarization reversed during electric field application tends to resume the original polarization direction, lowering the contrast during memory periods and failing to provide high bistability.

The ferroelectric liquid crystal inevitably suffers from a lowering of bistability and contrast associated with its spontaneous polarization. A delay of the response time from the theory is also considered due to the spontaneous polarization.

It should be understood that these problems resulting from the spontaneous polarization of ferroelectric liquid crystal arise not only with the orienting film formed by the LB technique, but also in orienting films formed by coating and other techniques.

SUMMARY OF THE INVENTION

Therefore, an object of the present invention is to provide a liquid crystal element characterized by satisfactory optical bistability, high contrast, and quick response.

Another object of the present invention is to provide a composition for forming a film of conductive organic compound feasible for the fabrication of such a liquid crystal element.

According to a first aspect of the present invention, there is provided a liquid crystal element comprising a pair of opposed substrates and electrodes on the opposed surfaces of the substrates. A ferroelectric liquid crystal is disposed between the substrates in a sealed manner. A film comprising a conductive organic compound is present on at least one of the opposed or inside substrate surfaces. The term "conductive" used herein is electroconductive throughout the disclosure.

Preferably the conductive organic compound film is present on each of the opposed substrates. The preferred conductive organic compound is a charge-transfer complex.

In preferred embodiments, the conductive organic compound film is formed by a Langmuir-Blodgett method, coating, vapor phase polymerization, or electrolytic polymerization.

The conductive organic compound film may consist essentially of a conductive organic compound or a mixture of conductive organic compound and an orienting agent. Alternatively or in addition thereto, an orienting film containing an orienting agent may be disposed between the conductive organic compound film and the substrate. The orienting agent may be selected from the group consisting of polyimides, polyamides, and polyamide-imides.

According to a second aspect of the present invention, there is provided a composition for forming a conductive organic compound film, comprising a charge-transfer complex and an orienting agent or a precursor thereof. The orienting agent or precursor thereof is particularly a polyimide or polyamic acid.

BRIEF DESCRIPTION OF THE DRAWINGS

The above and other objects, features, and advantages of the present invention will be better understood from the following description taken in conjunction with the accompanying drawings, in which:

FIG. 1 is a diagram showing the contrast and bistability of liquid crystal elements having orienting films with varying contents of charge-transfer complex;

DETAILED DESCRIPTION OF THE INVENTION

Figure 2:
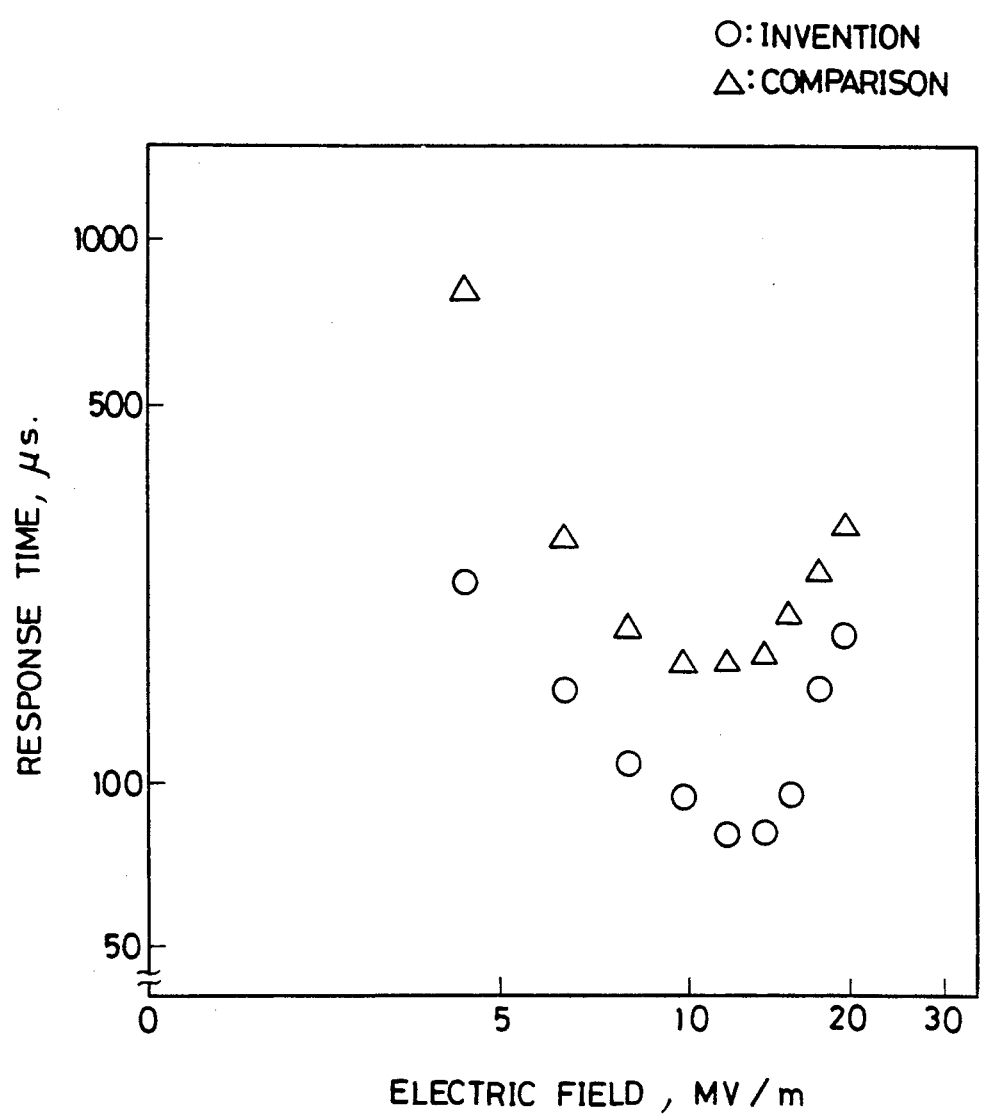
FIGS. 2, 3, 4, and 5 are diagrams showing the response time of liquid crystal elements versus applied electric field intensity.

Japanese Patent Application Kokai No. 121020/1988 discloses a ferroelectric liquid crystal element comprising an orienting film having a conductivity or a resistivity $\rho$ of lower than $1 \times 10^8$ $\Omega$-cm. This ferroelectric liquid crystal element eliminates the non-uniform ion distribution in the liquid crystal layer due to an internal electric field by polarization charge a previously mentioned, thus preventing variations and changes-with-time of liquid crystal molecules.

In this element, a conductive material is contained in an organic material to impart conductivity to an orienting film formed therefrom. Inorganic materials are disclosed as examples of the conductive material, including conductive carbon, metals in powder, fiber and whisker forms such as gold, silver and copper, oxides of transition metals such as Sn, In, Ni and Ti, and modified transition metal oxides in which oxides of metals having different valences form a solid solution, such as $SnO_2$-$Sb_2O_3$. Organic compounds, especially polyimides are preferred as the orienting film-forming material from the standpoints of ease of film formation, homogeneity, orienting nature, compatibility with liquid crystal molecules, abruptness of threshold characteristics, and compatibility with multiplex drive. When the above-listed inorganic materials are used as the conductive material, a problem arises with respect to the compatibility thereof with the organic compounds from which orienting films are formed. Conductive particles of inorganic materials as disclosed tend to electrically coalesce into secondary particles which are difficult to evenly disperse in an orienting film-coating solution, adversely affecting light transmittance and display characteristics.

In addition, most conductive inorganic materials such as conductive carbon, metal powder, fibers and whiskers lack transparency. Then orienting films containing them have low light transmittance, failing to provide liquid crystal elements with satisfactory performance irrespective of whether they are of transmission or reflection type.

Further, the above-cited disclosure describes transparent particles of conductive inorganic material having a particle size of up to 0.4 $\mu$m, preferably up to 0.2 $\mu$m. It is very difficult in practice to prepare fine particles of such order. The above-cited disclosure teaches nowhere how to prepare fine particles.

The liquid crystal element according to the present invention includes a liquid crystal disposed between a pair of opposed substrates in a sealed manner. A film comprising or consisting essentially of a conductive organic compound is disposed on the surface of the opposed substrates.

Liquid Crystal

The liquid crystals used in the liquid crystal elements of the invention are ferroelectric liquid crystals. The term "ferroelectric" used herein means that a crystal exhibits spontaneous polarization with permanent dipole moments aligned parallel in an identical direction. Ferroelectric liquid crystals having chiral smectic phase are most often used in the practice of the invention.

Examples of the ferroelectric liquid crystals having chiral smectic phase are shown below.

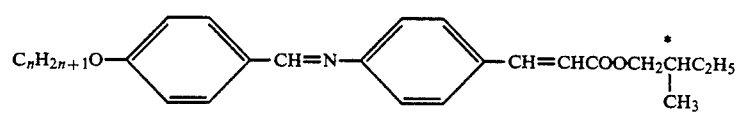
(FLC-1)

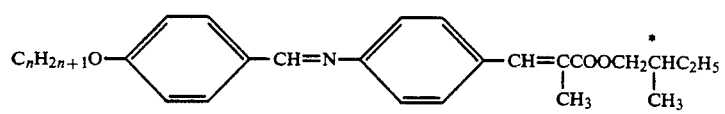
(FLC-2)

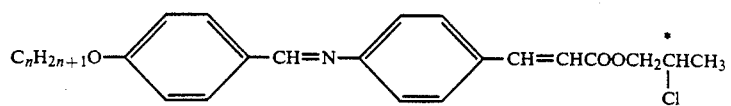
(FLC-3)

-continued
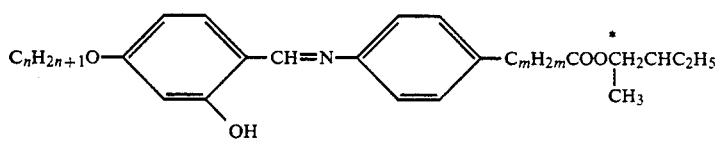 (FLC-4)
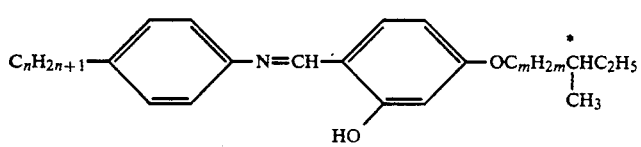 (FLC-5)
 (FLC-6)
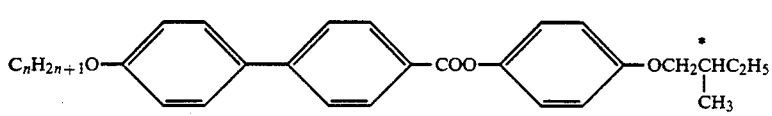 (FLC-7)
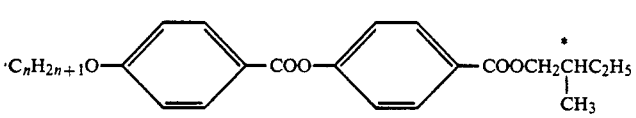 (FLC-8)
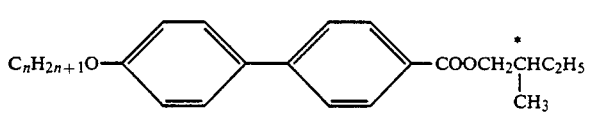 (FLC-9)
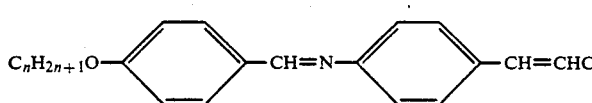 (ELC-10)
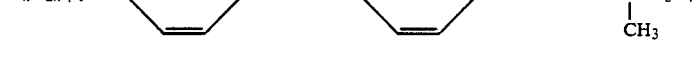 (FLC-11)
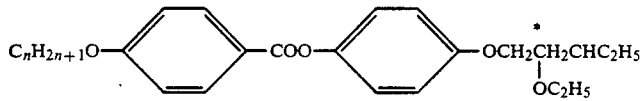 (FLC-12)
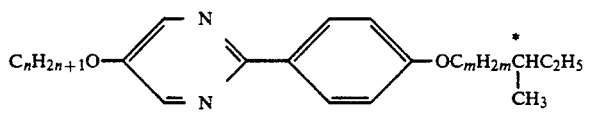 (FLC-13)
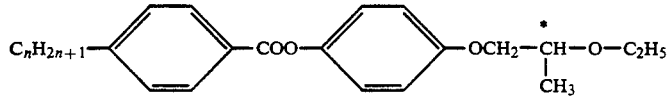 (FLC-14)
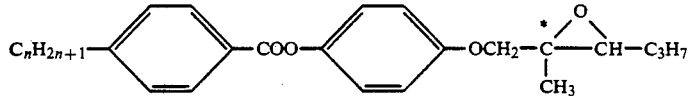 (FLC-15)
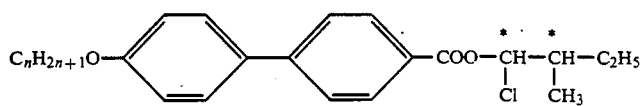

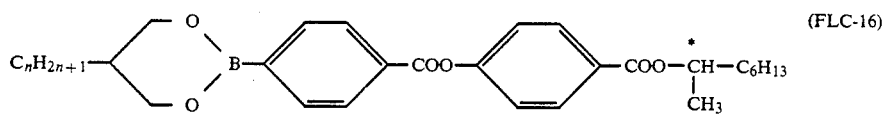
(FLC-16)

In the above formulae, it is preferred that n ranges from 4 to 20 and m ranges from 1 to 6.

There are some liquid crystals having low viscosity and a wide temperature range at which they exhibit smectic phase, preferably smectic C phase. It is possible to induce chiral smectic phase in such liquid crystal by adding about 10% by weight of a chiral dopant having C*. These liquid crystals having chiral dopant added thereto may also be used as the ferroelectric liquid crystal.

The following are examples of the liquid crystals having low viscosity and a wide temperature range at which they exhibit smectic phase.

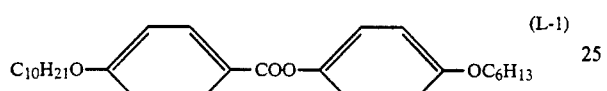
(L-1)

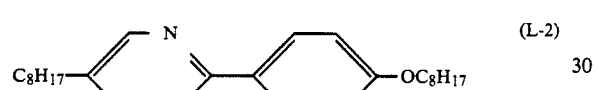
(L-2)

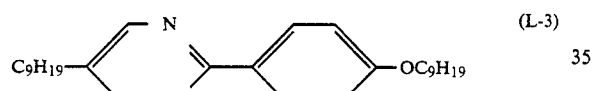
(L-3)

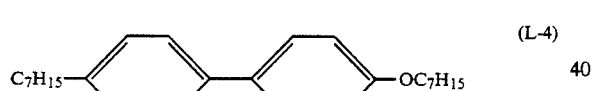
(L-4)

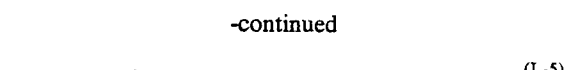
(L-5)

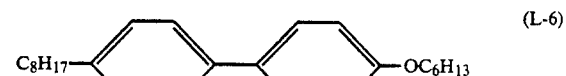
(L-6)

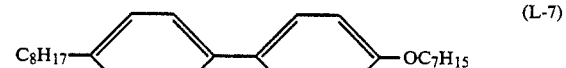
(L-7)

(L-8)

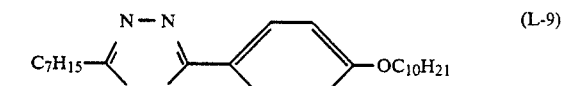
(L-9)

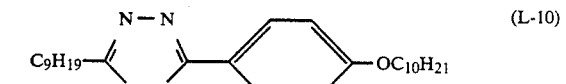
(L-10)

Examples of the chiral dopant are shown below.

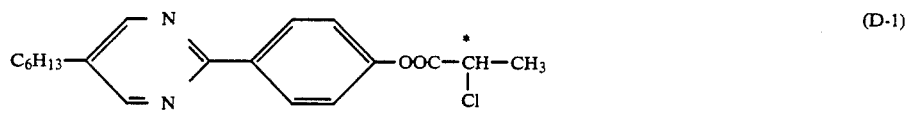
(D-1)

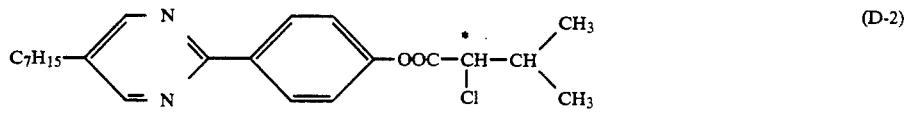
(D-2)

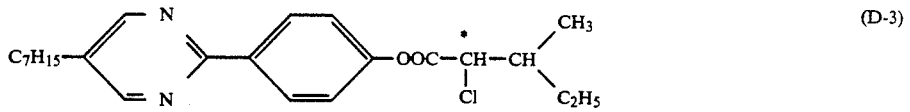
(D-3)

(D-4)

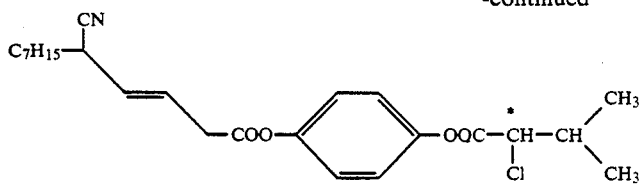
(D-6)
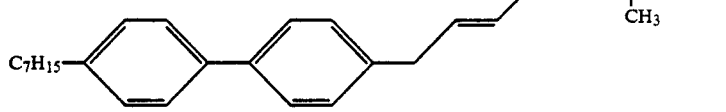
(D-7)
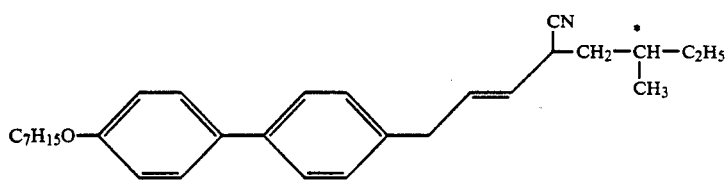
(D-8)
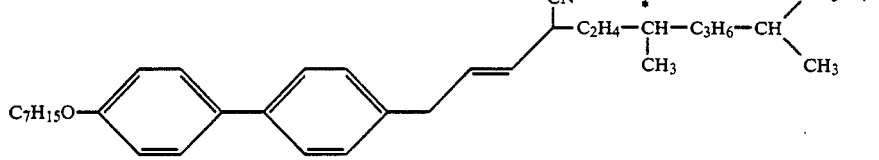
(D-9)
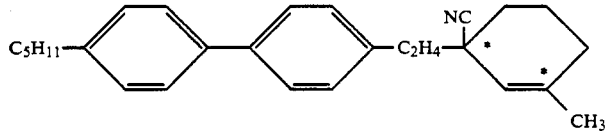
(D-10)
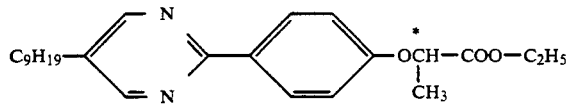
(D-11)
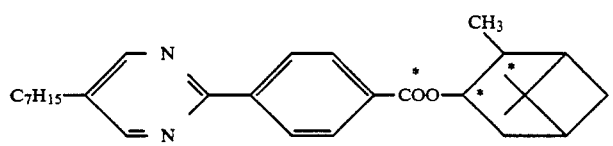
(D-12)
Preferred dopants including the foregoing examples have optically active groups as shown below.
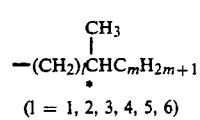
(l = 1, 2, 3, 4, 5, 6)
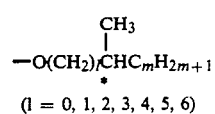
(l = 0, 1, 2, 3, 4, 5, 6)
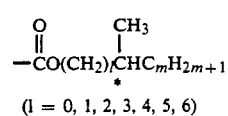
(l = 0, 1, 2, 3, 4, 5, 6)
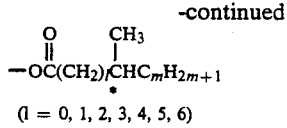
(l = 0, 1, 2, 3, 4, 5, 6)
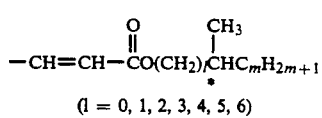
(l = 0, 1, 2, 3, 4, 5, 6)
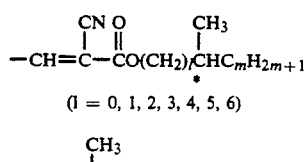
(l = 0, 1, 2, 3, 4, 5, 6)
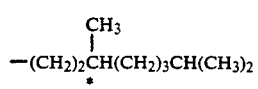

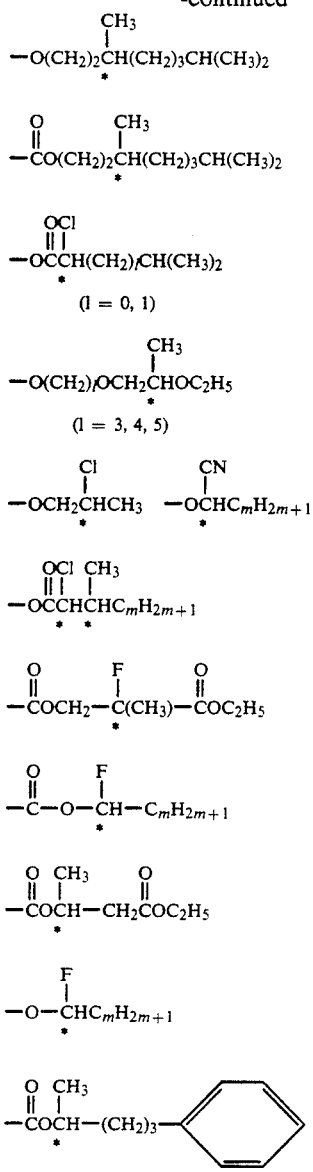

In the above formulae, m is 1 to 6.
These ferroelectric liquid crystals are commercially available in the trade names of ZLI-3488, ZLI-3489, and ZLI-3654 (E. Merck Co.), CS-1011, CS-1013, CS-1014, and CS-1015 (Chisso K.K.), and TKF-8616, TKF-8617, and TKF-8618 (Teikoku Chemical Industry K.K.), to name a few.

Conductive Organic Compound Film

According to the present invention, in the liquid crystal element having the ferroelectric liquid crystal sealed between the opposed substrates, a conductive organic compound film is present on at least one of the opposed or inside substrate surfaces. The conductive organic compound film used herein may be either a film comprising a conductive organic compound or a film consisting essentially of a conductive organic compound. Since the conductive substance used herein is an organic compound, the invention has advantages that the conductive film is easy to form, well compatible with the liquid crystal, and uniform over the substrate surface.

The conductive organic compounds used herein are not particularly limited insofar as they are organic and electroconductive. Several preferred, non-limiting examples of the conductive organic compound are given below.

(I) Charge-Transfer Materials

Charge-transfer complexes are preferably used as the charge-transfer materials.

The charge-transfer complexes consist of an electron donor (sometimes abbreviated as D) and an electron acceptor (sometimes abbreviated as A). Electron transfer takes place between the donor and acceptor, providing a stable complex by virtue of electron transfer interactions and the resulting Coulomb attractive force and Van der Waals force. The charge-transfer complexes generally exhibit high conductivity since they allow for relatively free motion of electrons.

The identity of donor and acceptor used herein and combinations of donor and acceptor which are charge-transfer complexes are not particularly limited and may be chosen from well-known species. Preferred examples of the donor and acceptor are shown below as well as preferred examples of their combinations or charge-transfer complexes.

Donor (D-1) Quinolines, for example,
quinoline,
N-isoamylquinoline, and
N-methallylisoquinoline.
(D-2) Pyridines, for example,
N-$C_{22}H_{45}$-pyridine,

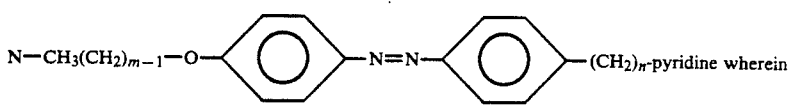

m = 8, 12 or 16 and n = 2 or 4, and

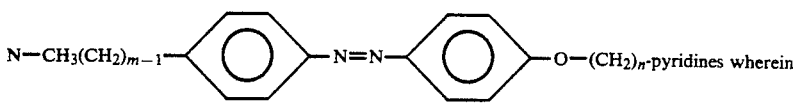

m = 5, 8 or 12 and n = 6, 8, 10 or 12.

(D-3) Fulvalenes, for example,
tetramethyltetrathiafulvalene (TMTTF),
tetramethyltetraselenafulvalene (TMTSF),
bisethylenedithiotetrathiafulvalene (BEDT-TTF),
tetrathiafulvalene (TTF), tetraselenafulvalene (TSeF),
bisdithiotetrathiafulvalene (BDT-TTF),
hexamethylenetetrathiafulvalene (HMTTF),
hexamethylenetetraselenafulvalene (HMTSF),
hexamethylenetetratellurafulvalene (HMTTeF),
tetrathiotetrathiafulvalene (TT-TTF),
bisvinyldithiotetrathiafulvalene (BBDT-TTF),
bisethylenediselenotetrathiafulvalene (BEDS-TTF),
tetrathioalkyltetrathiafulvalenes (TTA-TTF),
tetraselenoalkyltetrathiafulvalene (TSeA-TTF),
tetratelluroalkyltetrathiafulvalenes (TTeA-TTF),
dithioheptylethylenedithiotetrathiafulvalene,
dithiooctadecylethylenedithiotetrathiafulvalene,
dimethylpropylenetetraselenafulvalene,
dimethylethylenedithiodiselenadithiafulvalene, and
ethylenedithiodiazotetrathiafulvalene.

(D-4) Tetracenes, for example,
tetrathiotetracene (TTT),
tetraselenotetracene (TSeT), and
2-fluorotetraselenotetracene (FTSeT).

(D-5) Cyanines, for example, 1,1'-dioctadecyl-2,2'-thiacarbocyanine.

(D-6) Dialkyl ammoniums (DAA), for example, dialkyl dimethyl ammoniums with an alkyl group having 10, 12, 14, 16 and 18 carbon atoms.

(D-7) Thiapyrenes, for example, 1,6-dithiopyrene (1,6-DTP).

Acceptor (A-1) Tetracyanoquinodimethanes (TCNQ), for example,
tetracyanoquinodimethane (TCNQ),
octadecyltetracyanoquinodimethane (ODTCNQ),
methyltetracyanoquinodimethane (MTCNQ),
tetradecyltetracyanoquinodimethane (TDTCNQ),
docosyltetracyanoquinodimethane (DCTCNQ),
tetrafluorotetracyanoquinodimethane ($F_4$TCNQ),
fluorotetracyanoquinodimethane (FTCNQ),
1,3-dimethyltetracyanoquinodimethane (DMTCNQ),
dithiophenetetracyanoquinodimethane, and
bis-1,2,5-thiadiazotetracyanoquinodimethane.

(A-2) Quinodiimines, for example, p-dicyanoquinodiimine (DCNQI).

(A-3) Hexylcyanobutadiene (HCBD).

(A-4) Quinones, for example,
p-chloranyl and
p-iodanyl.

(A-5) Metal-(dmit)$_2$, for example, M-1,3-dithiol-2-thione-4,5-dithiclate wherein M is Ni or Au.

(A-6) Metal (mnt)$_2$, for example, Ni-dimaleonitrile dithiolate.

Donors and acceptors as exemplified above together form charge-transfer complexes, preferred examples of which are shown below.

[CTC-1]
 (N-isoamylquinoline).(TCNQ)$_2$

[CTC-2]
 (N-methallylisoquinoline).(TCNQ)$_2$

[CTC-3]
 (TMTTF).(ODTCNQ)

[CTC-4]
 (quinoline).(TCNQ)$_2$

[CTC-5]
 (N-isoamylquinoline).(MTCNQ)$_2$

[CTC-6]
 (TMTTF).(MTCNQ)

[CTC-7]
 (N—$C_{22}H_{45}$-pyridine).(TCNQ)

[CTC-8]
 (N—$C_{22}H_{45}$-pyridine).(TCNQ)$_2$

[CTC-9]
 (1,1'-dioctadecylthiacarbocyanine).(TCNQ)$_2$

[CTC-10]
 (TTF).(ODTCNQ)

[CTC-11]
 (TMTTF)$_3$.(TDTCNQ)$_2$

[CTC-12]
 (TMTTF).(DCTCNQ)$_2$

[CTC-13]
 (TTF).(TCNQ)

[CTC-14]
 [N—$CH_3(CH_2)_{m-1}$—O—⟨O⟩—N=N—⟨O⟩—$(CH_2)_n$-pyridine].(TCNQ)$_2$
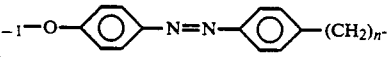

[CTC-15]
 [N—$CH_3(CH_2)_{m-1}$—⟨O⟩—N=N—⟨O⟩—O—$(CH_2)_n$-pyridine].(TCNQ)$_2$
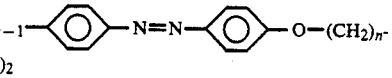

[CTC-16]
 (DAA.[M-(dmit)$_2$])

Complexes [CTC-1], [CTC-2], [CTC-3], [CTC-4], [CTC-5], and [CTC-6] are commercially available from Nihon Carlit K.K. under the trade names of SOC-I, SOC-II, LOC-I, LOC-II, LOC-III-1, and LOC-III-2.

Other known charge-transfer materials may be used.

(II) Conjugated Polymers

The conjugated polymers used herein are not particularly limited. Preferred examples of the conjugated polymers include polyacetylene, poly-1-alkynes, polycyanoacetylene, polyphenylacetylene, polychlorophenylacetylene, polymethylazomethine, difluoroacetylene, poly-paraphenylene, poly-para-phenylene sulfide, poly-para-phenylene selenide, poly-para-phenylene oxide, poly-para-phenylene vinylene, poly-para-phenylene azomethine, poly-para-azophenylene, polydiphenylene vinylene, polyaniline, polypyrrole and 3-substituted derivatives and other derivatives thereof such as poly-N-methylpyrrole, polythiophene and 3-substituted derivatives thereof such as poly-3-alkylthiophenes such as poly 3-methylthiophene and poly-3-thiophene-alkene sulfonates, polythiophene vinylene, polyfuran, polyselenophene, polytellurophene, polyisothionaphthene, polyisonaphthothiophene, polyazulene, polynaphthylene, polybiphenylene, polyacene, polybenzothiophine, polynaphthyridine (polypyridinopyridine), polycyanodiene (polypyrazinopyrazine), polyarene metalloids, polyperinaphthalene, and polyperianthracene.

(III) Metal Complexes

The metal complexes used herein are not particularly limited. Preferred examples of the metal complexes include metal phthalocyanines and their derivatives such as porphyrin complexes.

(IV) Polymers Having a Metal Complex in Their Backbone or Side Chain

Polymers having a metal complex as exemplified in (III) in their backbone or side chain may be used. Preferred polymers are polymers having a metal phthalocyanine residue in their side chain as described in Japanese Patent Application Kokai No. 54104/198.

The conductive organic compound films preferably contain any of the above-mentioned conductive organic compounds in amounts of about 0.01 to 30% by weight, more preferably about 0.01 to 25% by weight, most preferably about 0.1 to 20% by weight of the film. It is also possible that the conductive organic compound film consists of the above-mentioned conductive organic compound or compounds.

The method of manufacture of the conductive organic compound film is not particularly limited, but the film is preferably formed by either of the LB method, coating, vapor phase polymerization, and electrolytic polymerization, which will be described in detail.

Film Formation by LB Method

The LB method can produce the conductive organic compound film in the form of a mono-molecular film or built-up film (to be abbreviated as an LB film) of a conductive organic compound, a mixed LB film of a conductive organic compound and another organic compound, or an LB film of another organic compound having a conductive organic compound incorporated therein.

The conductive organic compounds used in this method are not particularly limited insofar as they can be formed by the LB method into a conductive LB film or incorporated into an LB film. Therefore, any of the above-mentioned conductive organic compounds may be advantageously used.

When a charge-transfer complex as mentioned in (I) is used, the conductive organic compound film may be an LB film, that is, a monomolecular or built-up film of the charge-transfer complex, an LB film of a mixture of the charge-transfer complex and another organic compound, or an LB film of another organic compound having the charge-transfer complex incorporated therein. Where the conductive organic compound film is an LB film of a charge-transfer complex or a mixed LB film of a charge-transfer complex and another organic compound, the charge-transfer complex should be one in which either the donor or the acceptor is amphiphatic. Such charge-transfer complexes are, for example, CTC-3, CTC-7 to 12, and CTC-14 to 16 as enumerated above.

The other organic compound used in the mixed LB film is not particularly limited insofar as it is amphiphatic. Preferred are polyimides, polyamides and polyamide-imides which will be described later.

The mixed LB film preferably contains the charge-transfer complex in amounts of about 0.01 to 30% by weight, more preferably about 0.01 to 25% by weight, most preferably about 0.1 to 20% by weight of the film. The conductive organic compound film exhibits favorable orientation when the content of the charge-transfer complex is within this range. It is to be noted that an LB film consisting of the charge-transfer complex also exhibits orientation.

It is also possible to form a conductive organic compound film by the LB method using an amphiphatic one selected from conjugated polymers (II) and metal complex-bearing polymers (IV). Examples of such amphiphatic polymers are polypyrrole (T. Iyoda et al., Tet. Lett., 27, 5633 (1986)), quinquethiophene (S. Tasaka et al., Synth. Met., 16, 17(1986)), poly(p-phenylene vinylene) (Nisikata et al., Japan Chemical Society, 56th Spring Meeting 2IIH47), polyaniline (Ando et al., Japan Chemical Society, 56th Spring Meeting 3IIH31), and polyimide LB films having porphyrin incorporated therein (Kakimoto et al., Nihon Kogyo Shinbun dated Mar. 2, 1988).

LB films containing metal complexes as enumerated in (III) are also encompassed within the conductive organic compound film of the present invention. Examples are LB films of Ni phthalocyanine doped with iodine (see Kawabata et al., Chemistry, Vol. 42, No. 1, 46 (1987)).

Also included are LB films formed from compounds having the following formula:

$$\text{Pc-(COOR}^1)_n \tag{I}$$

wherein Pc is a phthalocyanine residue and $R^1$ is an alkyl radical, and letter n is an integer of from 1 to 16, or

$$\text{tppa-(R}^2)_m \tag{II}$$

wherein tppa is a tetrapyridinoporphyrazine residue, $R^2$ is an alkyl radical, and letter m is an integer of from 1 to 4, as described in Japanese Patent Application Kokai No. 59286/1987.

The LB method used herein may take the following steps.

First, a spreading solution is prepared by dissolving a conductive organic compound as mentioned above alone or in admixture with another organic compound in a solvent. The solvent may be selected from water-soluble solvents and volatile solvents, for example, such as acetonitrile, N-methyl-2-pyrrolidone, N,N-dimethylacetamide, and benzene, depending on a particular conductive organic compound used.

The spreading solution is slowly added dropwise to the surface of water in a trough. As a barrier is then moved in the trough to reduce the area of the water surface defined between the trough wall and the barrier, the area occupied per molecule is reduced to raise the surface pressure to eventually form an orderly condensed film which remains as a stable mono-molecular film. The mono-molecular film can be transferred one-by-one film from the water surface to a liquid crystal element substrate by vertically moving up and down the substrate while the surface is kept under a constant pressure of 10 to 40 dyn/cm. The mono-molecular or built-up film can be an X, Y or Z-type film, depending on the conductive organic compound used, surface pressure, and substrate surface state. Either of these films is acceptable in the present invention.

Apart from the above-mentioned vertical immersion method wherein the substrate is moved perpendicular to the water surface, the horizontal application method may also be used wherein a mono-molecular film is attracted to a horizontally held substrate. The vertical immersion method is desirable, with the pull method being most desirable.

The substrate is preferably pre-treated before subjecting to the LB method.

In the practice of the invention, the mono-molecular film may be present on the substrate as a single layer or as a built-up film by transferring two or more layers. The built-up film may consist of 2 to 200 layers, preferably 3 to 10 layers.

The conductive organic compound film formed by the LB method has a unidirectional orientation in that the backbone chains are in alignment with the line of travel of the substrate. In addition, the film has conductivity and a function of causing horizontal or homogeneous alignment of liquid crystal molecules.

Where the conductive organic compound is a polymerizable compound having a radiation-sensitive unsaturated bond or the like, it may be polymerized after it has been formed into an LB film by the above-mentioned method. Interfacial polymerization may be employed whereby, a mono-molecular film is polymerized on the spreading water surface and the resulting polymerized film is transferred onto the substrate surface.

Film Formation by Coating

The conductive organic compound film may be formed on the substrate by any well-known coating methods including spinner coating, roll coating, spray coating, dipping, and gravure coating. Casting is also useful. The solvent used in coating may be properly selected in accordance with a particular conductive organic compound used.

The conductive organic compounds which can be formed into films by the coating method include charge-transfer complexes as mentioned above and soluble conjugated polymers such as poly(3-alkylthiophene) (M. Sato et al., J. Chem. Soc., Chem. Commun., 1986, 873 and S. Hotta et al., Macro. molecules, 20, 212 (1987)), alkylthiophene random copolymers (K. Y. Jen et al., J. Chem. Soc., Chem. Commun., 1986, 1346), and poly(3-substituted thiophene) and poly(3-substituted pyrrole) (M. R. Bryce et al., J. Chem. Soc., Chem. Commun., 1987, 466). Also useful are soluble porphyrin complexes of formula (I) or (II) as described in Japanese Patent Application Kokai No. 59286/1987.

The conductive organic compound film may be a coated film of a mixture of such a conductive organic compound and another organic compound. The other compounds combined therewith are not particularly limited although those compounds capable of exerting good orientation upon rubbing are preferred. Such compounds are preferably selected from the well-known orienting agents which will be described later. When the conductive organic compounds used are charge-transfer complexes, the other organic compounds are preferably selected from polyimides, polyamides, and polyamide-imides.

The coated conductive organic compound film preferably contains the charge-transfer complex in amounts of about 0.01 to 30% by weight, more preferably about 0.01 to 25% by weight, most preferably about 0.1 to 20% by weight of the film.

To impart orientation to the conductive organic compound film formed by coating, the film is preferably rubbed on the surface. Rubbing may be carried out in a conventional manner in one direction or in two directions crossing at an angle twice the tilt angle ($\theta$) of a ferroelectric liquid crystal used or in three directions including a third direction tangential to the film in addition to the above-mentioned two directions.

Film Formation by Vapor Phase Polymerization

The vapor phase polymerization used herein includes vapor phase film deposition methods including chemical vapor deposition (CVD) and evaporation methods, combined with any well-known polymerization methods including plasma polymerization electron beam polymerization, and ultraviolet radiation polymerization.

The conductive organic compounds which can form conductive organic compound films by vapor phase polymerization include polyperinaphthalene (M.L. Kaplan et al., Appl. Phys. Lett., 36. 869 (1980)), polypyrrole (Mizumoto et al., 35th Japan Polymer Society Annual Meeting Preprints, II-9-05, 35 570 (1986)), copper phthalocyanine (Osada et al., J. Appl. Phys., 59, 1776 (1986)), metal phthalocyanine (Tsuruta et al., 35th Japan Polymer Society Annual Meeting Preprints, II-9-08, 35, 573 (1986)), and tetraalkoxyphthalocyanine (Tsuruta et al., 35th Polymer Society Annual Meeting Preprints, II-9-09, 35, 574 (1986)).

To impart orientation to the conductive organic compound film formed by vapor phase polymerization, the film is preferably rubbed on the surface as described in the previous section.

Film Formation by Electrolytic Polymerization

The electrolytic polymerization is by dissolving an electrolyte and a monomer to be polymerized in a suitable solvent both in amounts of about 0.1 to 1 mol/liter to prepare an electrolytic solution, and applying voltage across electrodes in the electrolytic solution, thereby forming a polymerized film on the anode plate.

The solvent used herein may be selected from acetonitrile, benzonitrile, dimethylformamide, nitrobenzene, dimethyl sulfate, diethyl sulfate, tetrahydrofuran, propylene carbonate, and methylene chloride.

The supporting electrolytes used herein include salts of monovalent metal ions (such as $Li^+$, $K^+$, $Na^+$, $Rb^+$, and $Ag^+$) with counter ions in the form of Lewis acid ions (such as $BF_4^-$, $PF_6^-$, $AsPF_6^-$, $p-BrC_6^-$, $H_4SO_3^-$, $p-MeC_6H_4SO_3^-$, $FSO_3^-$, and $CF_3CO_2^-$), salts of tetraalkyl ammonium ions ($R_4N^+$), for example, various perchlorate salts ($M-ClO_4$), and strongly acidic solutions of $H_2SO_4$, $HF$, $HF/SbF_5$, $HCl/AlCl_3$ or the like.

The electrodes may be of Hg, Pt, Al, $In/SnO_2$, $In/SnO_2$-Ni, and glassy carbon, for example.

The solvent, electrolyte and electrodes may be properly selected from the foregoing examples so as to meet a particular monomeric conductive organic compound used.

The conductive organic compounds which form conductive organic compound films by electrolytic polymerization include polypyrrole (see A. F. Diaz et al., J. Chem. Soc., Chem. Commun., 635 (1979)), polythiophene (see K. Kaneto et al., J. Chem. Soc., Chem. Commun., 3S2 (1983)), poly(3-methylthiophene) (see M. Sato et al., J. Chem. Soc., Chem. Commun., 713 (1985)), poly-para-phenylene (see M. Satoh et al, J. Chem. Soc., Chem. Commun., 1629 (1985)), and polyaniline (see A. F. Diaz et al., J. Electroanal. Chem., 111, 111 (1980)).

To impart orientation to the conductive organic compound film formed by electrolytic polymerization, the film is preferably rubbed on the surface as described in the previous section. It is also possible to uniaxially stretch the conductive organic compound film to impart orientation thereto. In this case, the conductive organic compound film may be first formed by electrolytic polymerization, subjected to uniaxial stretching, and then bonded to a liquid crystal element substrate.

The conductive organic compound films formed by the above-mentioned various methods generally have a thickness of up to 5,000 Å, more preferably 50 to 1,000 Å. The conductive organic compound film most preferably has a thickness of from about 12 to 200 Å when it is an LB film.

The preferred thickness of the conductive organic compound film is up to 4,000 Å, more preferably from about 50 to about 800 Å when the film is formed on an orienting film which will be described later. In this situation, the most preferred thickness of the conductive organic compound film is the same as above when it is an LB film.

The conductive organic compound films described above preferably have a conductivity of at least $1 \times 10^{-10}$ S/cm. The upper limit of conductivity is determined such that no short-circuiting occurs between the electrodes on the same substrate. Preferably, the films have a conductivity of $1 \times 10^{-8}$ to $1 \times 10^{-1}$ S/cm.

orienting agents are described in Japanese Patent Application Kokai No. 60422/1988.

In the practice of the invention, the orienting agent is preferably selected from polyimides, polyamides, polyamide-imides among others. Formation of an orienting film by the LB method using these compounds is described below by way of illustration.

The polyimides used herein are synthesized from a precursor in the form of a polyamic acid which is prepared from a tetracarboxylic acid dianhydride and a diamine as starting reactants. The polyamic acid is commercially available under the trade names of Sunever RN-710, RN-305 and RN-310 (manufactured by Nissan Chemical K.K.) and PIX-5400 (manufactured by Hitachi Chemicals K.K.).

In order that the LB method be applicable, the polyamic acid is converted into an alkyl amine salt. For example, a polyamic acid is first synthesized according to the following scheme.

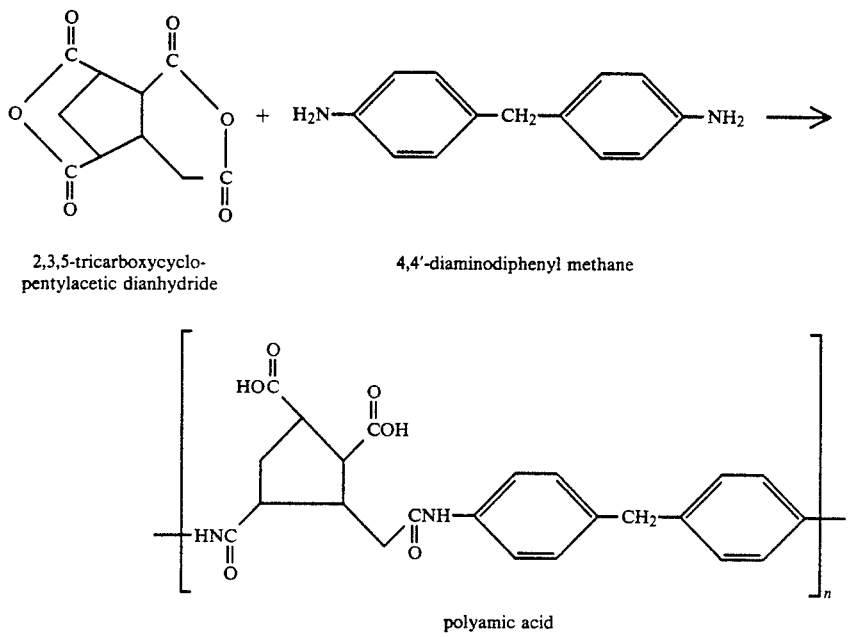

Orienting Film

In a further embodiment of the invention, the liquid crystal element further includes an orienting film for orienting liquid crystal molecules between the conductive organic compound film and the associated substrate.

It is not critical how to form the orienting film. An LB method, coating or any other film-forming methods as previously described may be properly selected so as to meet the purpose.

The orienting agent which constitutes the orienting film is not particularly limited insofar as the film can exert orienting function as formed or after rubbing. A proper agent may be selected from well-known orienting agents in consideration of a feasible film-forming method. Examples of the orienting agent include various resins such as polyimides, polyamides, polyamide-imides, polyvinyl alcohol, polyesters, polycarbonate, polyvinyl acetal, polyvinyl chloride, polyvinyl acetate, polystyrene, cellulose resins, melamine resins, urea resins, and acrylic resins, various surface-active agents, silane coupling agents, and chromium complexes. These The polyamic acid is reacted with 0.5 to 2 equivalents of a long chain alkyl amine as shown below to form a polyamic acid alkyl amine salt. Preferred examples of the long chain alkyl amines used herein include

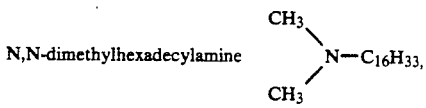

decyl amine ($H_2N-C_{10}H_{21}$), and tetradecylamine ($H_2N-C_{14}H_{29}$).

The polyamic acid is generally synthesized from a tetracarboxylic acid dianhydride and a diamine. Preferred examples of the tetracarboxylic acid dianhydride include pyromellitic dianhydride, 3,4,3',4'-biphenyltetracarboxylic dianhydride, bis(3,4-dicarboxyphenyl)ether dianhydride, 3,4,3',4'-benzophenonetetracarboxylic dianhydride, bis(3,4-dicarboxyphenyl)sulfone dianhydride, and bis(3,4-dicarboxyphenyl)methane dianhydride. Preferred examples of the diamine include p- phenylenediamine, 4,4'-diaminobiphenyl, 4,4'-oxydianiline, 4,4'-methylenedianiline, and 4,4'-sulfonyldianiline.

The polyimide compound is preferably obtained by converting the above-described polyamic acid alkyl amine salt which is a polyamide compound according to a conventional method using heat or acid anhydride. In the case of heat conversion, the heating temperature generally ranges from 170 to 400° C., preferably from 170 to 250° C. Acetic anhydride is a preferred example of the acid anhydride used for conversion.

The polyamide compound may be converted into a polyimide compound by first transferring a monomolecular film of a polyamic alkyl amine salt to a substrate, and then dipping the substrate in acid anhydride or heating the substrate, with dipping in acid anhydride being preferred.

The polyamide-imide compound used herein is obtained by first synthesizing a polyamide-amic acid according to the following scheme, for example.

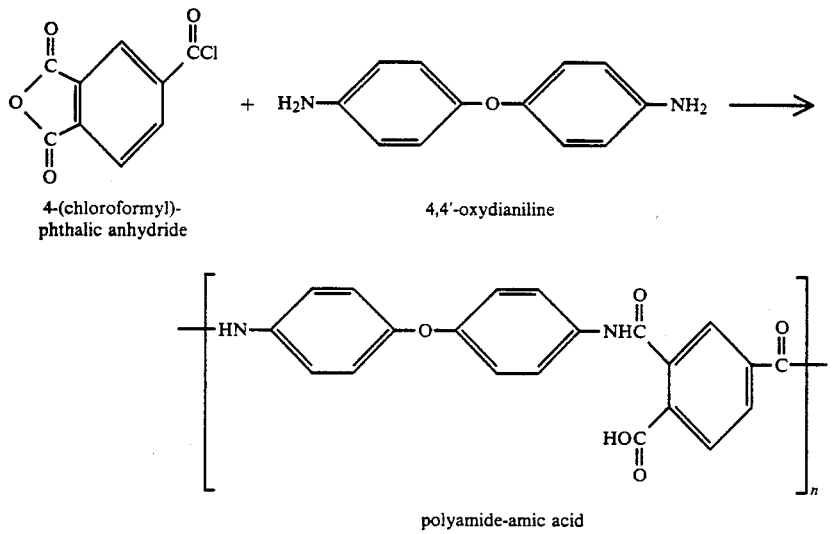

polyamide-amic acid

The polyamide-amic acid is reacted with an alkyl amine to form a polyamide-amic acid alkyl amine salt as described for the polyimide compound and thereafter, converted into a polyamide-imide through heat or acid anhydride. One example of the polyamide-imide compound is represented by the following formula:

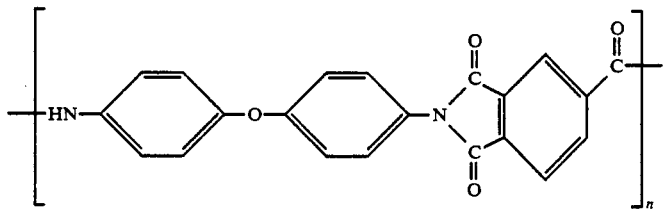

For the synthesis of polyamide-amic acids, any of the aromatic diamines described for the synthesis of polyamic acids may also be used in addition to 4,4'-oxydianiline.

The following are illustrative of the orienting film-forming composition containing an orienting agent as mentioned above.

(1) Solutions of polyimide in N-methylpyrrolidone, dimethylformamide, dimethylacetamide, γ-butyl-lactone or a similar solvent. They are commercially available as Semicofine SP and LP (manufactured by Toray K.K.) and Optomer AL (manufactured by Nihon Synthetic Rubber K.K.).

(2) Solutions of polyamic acid in N-methylpyrrolidone or a similar solvent. A typical concentration is about 6% by weight. The solutions of polyamic acids as polyimide precursors are commercially available as Sunever RN-305, RN-710 and RN-130 (manufactured by Nissan Chemical K.K.) and PIX-5400 (manufactured by Hitachi Chemicals K.K.). Also useful are solutions of the compounds which can be eventually converted into polyimides, for example, PIQ (manufactured by Hitachi Chemicals K.K.), JR-100 and JR-190 (manufactured by Nitto Electric K.K.) in N-methylpyrrolidone.

(3) Solutions of polyamides (nylon-6, nylon-66, etc.) in cresol or a mixture of cresol and lower alcohol. A typical concentration is about 10% by weight.

(4) Solutions of polyvinyl alcohol in water. A typical concentration is about 5% by weight.

Any desired one of the orienting film-forming compositions mentioned above may be used as a spreading solution, from which an orienting film can be formed by the same LB method as previously mentioned. The concentration of the orienting agent in the spreading solution preferably ranges from about 0.1 to about 20% by weight.

The orienting film formed by the LB method has orienting nature like the conductive organic compound film formed by the LB method although it may be subjected to additional orienting treatment such as rubbing.

When the conductive organic compound film formed by the LB method is a mixed LB film of a charge-transfer complex and another organic compound or an LB film of another organic compound having a charge-transfer complex incorporated therein, the conductive organic compound film-forming composition used as the spreading solution should preferably the above-described orienting film-forming composition having a charge-transfer complex added thereto. In this case, the conductive organic compound film-forming composition preferably contains an orienting agent and a charge-transfer agent in a total concentration of 0.01 to 30% by weight, more preferably 0.01 to 25% by weight, most preferably 0.1 to 20% by weight.

When a conductive organic compound film containing a charge-transfer complex is formed by coating, the coating solution should preferably be the above-mentioned conductive organic compound film-forming composition.

An orienting film may also be formed by a coating method involving the steps of dissolving an orienting agent in a solvent to a desired concentration, and coating the solution to a substrate on which an electrode has been formed in a predetermined pattern. The solution used herein may be the above-described orienting film-forming composition, for example. The orienting agent used in the coating method may be selected from the orienting agents previously enumerated in conjunction with the LB method.

Coating may be carried out by any well-known methods including spinner coating, roll coating, spray coating, dipping, and gravure coating. A proper solvent may be selected in consideration of a particular compound and method used.

In forming an orienting film by coating, the resulting film is preferably rubbed on the surface to impart orienting nature thereto. Rubbing may be carried out in a manner as described in conjunction with the conductive organic compound film.

The thickness of the orienting film varies with a film-forming method used and the identity of compound and also depends on a particular compound and method used to construct the conductive organic compound film thereon. Generally, the orienting film has a thickness of up to 1,000 Å, preferably from about 12 to about 200 Å.

Substrate

The substrate on which the orienting film is formed is not particularly limited. Any desired material may be selected from well-known substrate materials such as float glass, soda lime glass, and film plastics so as to meet the purpose. The electrodes may be well-known transparent electrodes such as ITO.

A liquid crystal element is fabricated according to the invention by opposing a pair of substrates, on at least one, preferably both of which a conductive organic compound film or a conductive organic compound film plus an orienting film are formed as described above, such that the films on the opposed substrates face each other. A ferroelectric liquid crystal is sealed between the substrates. The element is then slowly cooled down until the liquid crystal assumes a ferroelectric phase (for example, SmC*).

While the element is slowly cooled down, voltage may be applied across the element. The applied voltage may be either of DC, AC (rectangular wave) or pulse voltage although bipolar pulse voltage is preferred. The preferred pulse voltage has a pulse duration of 1 $\mu$sec. to 10 msec., more preferably 10 $\mu$sec. to 1 msec., a height of 5 to 100 volts, more preferably 10 to 50 volts, and a period 1 to 100 times the pulse duration, more preferably 2 to 50 times the pulse duration. The applied voltage assists in achieving desired orientation.

EXAMPLE

Examples of the present invention are given below by way of illustration and not by way of limitation.

EXAMPLE 1

A conductive organic compound film was formed by coating as described below.

First, an ITO transparent electrode was formed on a substrate by electron beam vapor deposition and then patterned. A coating composition was prepared by dissolving 6% by weight of polyamic acid (trade name Sunever RN-305 manufactured by Nissan Chemical K.K.) in NMP, adding 0.6% by weight of a charge-transfer complex (trade name LOC-I manufactured by Nihon Carlit K.K.) to the N-methyl pyrrolidone (NMP) solution, and agitating the mixture into a homogeneous solution by a ultrasonic cleaning technique. The coating solution was applied to the substrate by spinner coating. The coated substrate was heat treated at 170° C. for one hour, forming a polyimide film containing 10% by weight of the charge-transfet complex. The film on the substrate was rubbed with nylon fabric, obtaining a conductive organic compound film having orientation.

A pair of coated substrates were prepared in this way. The substrates were opposed and joined together through an alumina spacer such that the conductive organic compound films on the opposed substrates faced each other and their rubbing directions were parallel to each other. The space between the opposed substrates was filled with a ferroelectric liquid crystal (trade name ZLI-3488 manufactured by E. Merck Company). After peripheral sealing in a conventional manner, the assembly was slowly cooled down from the isotropic phase, obtaining a liquid crystal element. During slow cool-down, bipolar pulses were applied across the assembly. The bipolar pulses had a duration of 1 msec., a height of 20 volts, and a period of 40 times the pulse duration.

A series of liquid crystal elements were fabricated by the same procedure as above except that the amount of charge-transfer complex added was varied. For comparison purposes, a liquid crystal element containing no charge-transfer complex was also fabricated. Also for comparison purposes, a liquid crystal element having a polyimide film containing 7% by weight of conductive carbon black was fabricated according to the Example of Japanese Patent Application Kokai No. 121020/1988.

These liquid crystal elements were measured for contrast, optical bistability and response time by the following methods while bipolar pulse voltage was applied across the elements. The bipolar pulses had a duration of 1 msec., a height of 20 volts, and a period of 40 times the pulse duration. The elements transmitted light upon positive voltage application and shielded light upon negative voltage application.

Contrast and Bistability

Provided that $T_1$ is a light transmittance upon positive electric field application, $T_2$ is a light transmittance with the positive electric field turned off (memory duration), $T_3$ is a light transmittance upon negative electric field application, $T_4$ is a light transmittance with the negative electric field turned off (memory duration), the contrast (MCRo) under an applied electric field, contrast (MCRm) during memory duration, bistability (Mb)

in light transmitting state and bistability (Md) in light shielding state were calculated according to the following expressions.

$$MCR_o = (T_1 - T_3)/(T_1 + T_3)$$

$$MCR_m = (T_2 - T_4)/(T_2 + T_4)$$

$$Mb = 2 \cdot [(T_2 - T_3)/(T_1 - T_3)] \cdot 100 - 100$$

$$Md = 2 \cdot [(T_1 - T_4)/(T_1 - T_3)] \cdot 100 - 100$$

The optical bistability or memory effect of a liquid crystal element is represented by (Mb+Md)/2.

FIG. 1 is a diagram in which contrast and bistability are plotted as a function of the content of charge-transfer complex.

It should be noted that the sample containing conductive carbon black was less light transmitting, resulting in MCRo and MCRm values of less than 0.5.

Response Time

The response time is a duration of time when the light transmittance varies from 10% to 90% upon application of a rectangular wave of 20 Hz.

FIG. 2 is a diagram showing response time vs. applied electric field intensity for the sample using the solution containing 0.6% by weight of the charge-transfer complex. FIG. 2 also shows the response time for the comparative sample containing no charge-transfer complex.

EXAMPLE 2

A liquid crystal element containing a charge-transfer complex was fabricated by the same procedure as in Example 1 except that a conductive organic compound film-forming composition was prepared by mixing an orienting film-forming composition as shown below with the charge-transfer complex used in Example 1.

The following orienting film-forming compositions were used:
Sunever RN-710,
Sunever RN-130 (both by Nissan Chemical K.K.),
PIX 5400,
HL 1110 (both by Hitachi Chemicals K.K.),
nylon-6 solution,
nylon-66 solution, and
polyvinyl alcohol solution.

These liquid crystal elements were examined by the same methods as in Example 1, finding equivalent results.

EXAMPLE 3

Films of organic compound containing charge-transfer complexes were formed on substrates by the LB method. Table 1 shows the organic compound of which the film was formed, and the type and content of the charge-transfer complex contained in the film. The charge-transfer complexes used were CTC-3 and CTC-11 previously described.

The substrate was the same as used in Example 1.

The compounds identified as polyamide and polyimide in Table 1 are as specified below.

Polyamide

A polyamic acid (trade name Sunever RN-710 or RN-305 by Nissan Chemical K.K.) was converted into an alkyl amine salt for LB film formation.

Polyimide

The above-mentioned polyamide was converted into a polyamide as will be described later.

The conductive organic compound films were formed by the LB method as follows.

The polyamic acid and the charge-transfer complex were dissolved in a 1/1 mixture of N,N-dimethylacetamide and benzene to a concentration of about 1 mmol/liter. An alkyl amine was added to the solution, obtaining a solution of a polyamic acid alkyl amine salt. The solution was added dropwise to water at 25° C. such that the solution spread over the water. The water used had been twice purified with an ion-exchange resin. A substrate was moved up and down at a rate of about 5 to 10 mm/min. perpendicular to the water surface while the barrier was controlled so as to set a surface pressure of 25 dyn/cm during upward motion and 10 or 19 dyn/cm during downward motion. There was formed a built-up film on the substrate. The number of built-up layers and the film thickness were reported in Table 1. The coated substrate was dried in vacuum, obtaining a conductive film of organic compound or polyamide containing the charge-transfer complex.

Where a polyimide was desired, the above-prepared conductive organic compound film of polyamide was immersed in an acid anhydride to convert the polyamide into a polyimide.

A pair of coated substrates were prepared in this way. The substrates were opposed and joined together through an alumina spacer such that the conductive organic compound films on the opposed substrates faced each other and the substrate pull-up directions or rubbing directions were parallel or anti-parallel to each other. The space between the opposed substrates was filled with the same ferroelectric liquid crystal as used in Example 1. After peripheral sealing in a conventional manner, the assembly was slowly cooled down from the isotropic phase, obtaining a liquid crystal element. During slow cool-down, bipolar pulses were applied across the assembly as in Example 1.

A series of liquid crystal elements were fabricated by the same procedure as above except that the amount of charge-transfer complex added was varied. For comparison purposes, a liquid crystal element containing no charge-transfer complex was also fabricated.

These liquid crystal elements were measured for contrast, optical bistability, and response time by the same methods as in Example 1.

The contrast and bistability of the liquid crystal elements are shown in Table 1.

Figure 3:
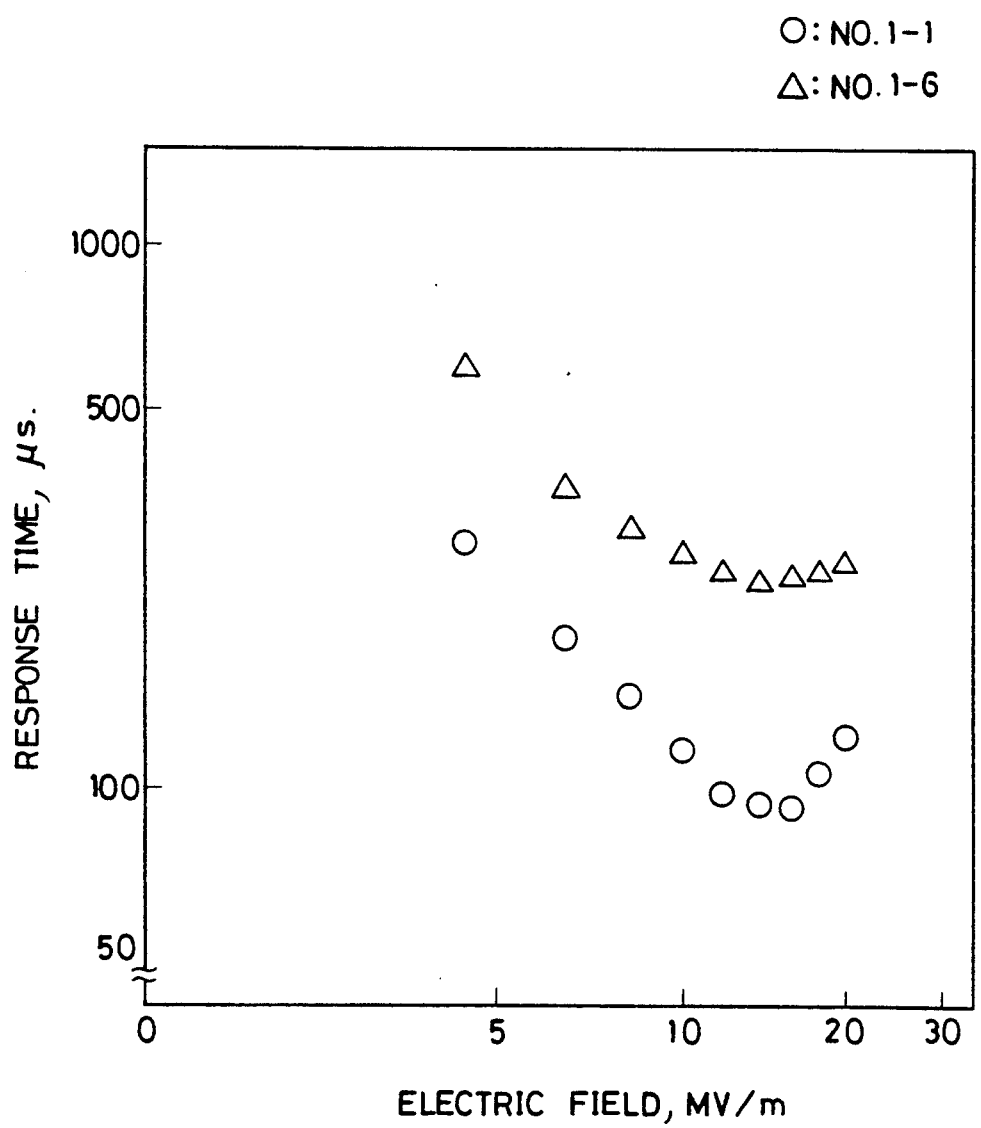

FIG. 3 is a diagram showing response time vs. applied electric field intensity for liquid crystal element sample No. 1-1. FIG. 3 also shows the response time for a similar liquid crystal element containing no charge-transfer complex (sample No. 1-6) for comparison purposes.

TABLE 1

| LC element No. | Conductive organic compound film | | | | | Substrate spacing ($\mu$m) | Contrast | | Memory (%) |
|---|---|---|---|---|---|---|---|---|---|
| | Organic polymer | CTC | (wt %) | Builtup number | Thickness (Å) | | MCRo | MCRm | |
| 1-1 | polyimide | CTC-3 | (2) | 3 | 12 | 1.4 | 0.82 | 0.82 | 100 |

TABLE 1-continued

| LC element No. | Conductive organic compound film | | | | Substrate spacing ($\mu$m) | Contrast | | Memory (%) |
|---|---|---|---|---|---|---|---|---|
| | Organic polymer | CTC | (wt %) | Builtup number | Thickness (Å) | | MCRo | MCRm | |
| 1-2 | polyimide | CTC-3 | (5) | 3 | 12 | 1.4 | 0.80 | 0.80 | 100 |
| 1-3 | polyimide | CTC-3 | (10) | 3 | 12 | 1.4 | 0.78 | 0.78 | 100 |
| 1-4 | polyimide | CTC-3 | (25) | 3 | 12 | 1.4 | 0.72 | 0.69 | 94 |
| 1-5 | polyimide | CTC-3 | (30) | 3 | 12 | 1.4 | 0.70 | 0.66 | 92 |
| 1-6* | polyimide | — | | 3 | 12 | 1.4 | 0.70 | 0.65 | 91 |
| 2 | polyimide | CTC-3 | (2) | 5 | 20 | 1.5 | 0.81 | 0.81 | 100 |
| 3 | polyimide | CTC-3 | (2) | 3 | 12 | 4.0 | 0.70 | 0.66 | 92 |
| 4-1 | polyimide | CTC-3 | (2) | 3 | 60 | 1.4 | 0.81 | 0.81 | 100 |
| 4-2 | polyimide | CTC-3 | (2) | 3 | 60 | 3.1 | 0.70 | 0.66 | 92 |
| 5 | polyimide | CTC-11 | (2) | 3 | 12 | 1.5 | 0.80 | 0.80 | 100 |

*comparison

EXAMPLE 4

A film of an conductive organic compound was formed on the same substrate as used in Example 1. A variety of liquid crystal element samples were fabricated by changing the conductive organic compound and the film forming method as reported in Table 2.

The compound and film forming method identified in Table 2 are as specified below.

Charge-transfer complex (CTC-3) LB film

A spreading solution was prepared by dissolving CTC-3 in a 1/1 mixture of acetonitrile and benzene. The solution was added dropwise to water at 25° C. such that the solution spread over the water. The water used had been twice purified with an ion-exchange resin. A substrate was moved up and down at a rate of about 5 to 10 mm/min. perpendicular to the water surface while the barrier was controlled so as to establish a surface pressure of 25 dyn/cm. There was formed a Y-type built-up film on the substrate. The coated substrate was dried, obtaining a film of conductive organic compound or charge-transfer complex.

A pair of coated substrates were prepared in this way whereby the films faced each other when the substrates were opposed to each other.

Metal phthalocyanine coated film

A polyimide (number average molecular weight 10,000) having a metal phthalocyanine in its backbone represented by the following formula:

wherein
Pc is Co phthalocyanine,
A is a benzene ring, and
B is

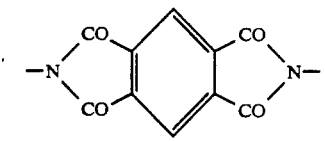

was synthesized according to Makromol. Chem., 180, 2073 (1979). The polyimide was applied to the substrate by spinner coating, forming a conductive organic compound film.

Vapor Phase polymerized polypyrrole Film

A film of vapor phase polymerized polypyrrole was formed by the method of Mizumoto et al. disclosed in Polymer Preprints, Jpn., Vol. 35, No. 3, pp 570 (1986). More illustratively, a plasma was generated by applying RF power at 13.56 MHz in a reactor of the cross type where pyrrole was plasma polymerized while doped with iodine (co-doping plasma-polymerization). The operating pressure was 0.3 Torr, the output was 50 watts, and the reaction time was 10 minutes.

Electrolytically Polymerized Polythiophene Film

In a dry box having an argon gas atmosphere with oxygen fully purged off, thiophene monomer was subjected to electrolytic polymerization on an $In/SnO_2$ electrode from a benzonitrile-$LiBF_4$ electrolytic solution. The voltage applied for polymerization was about 20 volts with a current density of about 10 $mA/cm^2$.

The thus fabricated liquid crystal elements were evaluated for contrast, bistability, and response time.

Contrast and Bistability

The measurement was the same as in Example 1 except that monopolar pulse voltage was applied across the elements. The monopolar pulses had a duration of 1 msec., a height of 20–30 volts, and a period of 40 times the pulse duration.

Response Time

The response time is a duration of time when the light transmittance varies from 10% to 90% upon application of a pulse voltage having a duration of 20 msec.

Table 2 shows the contrast and optical bistability (or memory effect) of the elements having various conductive organic compound films.

Figure 4:
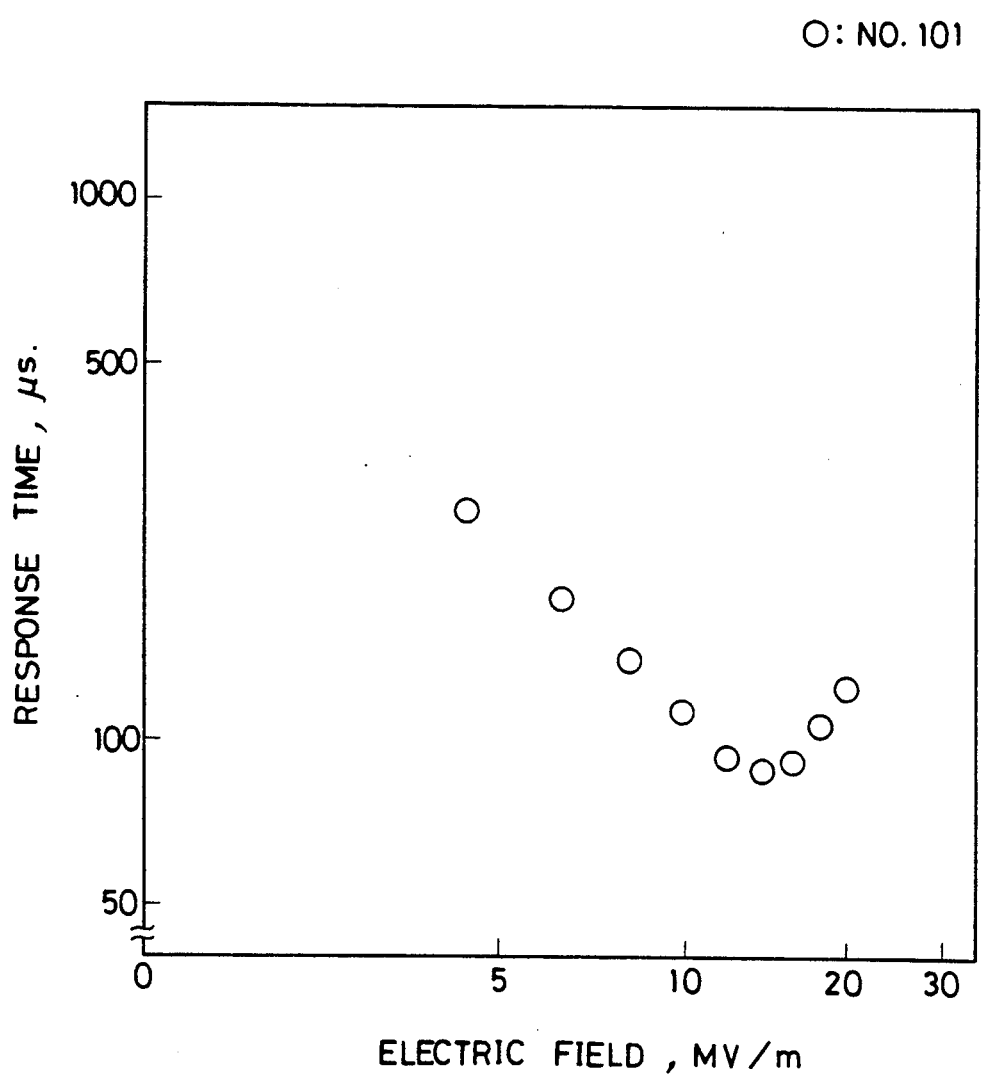

FIG. 4 shows the response time vs. applied electric field intensity of liquid crystal element No. 101.

TABLE 2

| Sample No. | Conductive organic compound film | | Contrast | | Bistability (%) |
|---|---|---|---|---|---|
| | Compound | Formation | MCRo | MCRm | |
| 101 | CTC-3 | LB | 0.72 | 0.69 | 94 |
| 102 | Metal phthalocyanine | coating | 0.61 | 0.59 | 95 |
| 103 | Polypyrrole | vapor phase polymerization | 0.62 | 0.60 | 95 |
| 104 | Polythiophene | electrolytic polymerization | 0.61 | 0.60 | 96 |

EXAMPLE 5

An orienting film was formed on the same substrate as used in Example 1 and then a conductive organic compound film was formed thereon. Various liquid crystal elements were fabricated by varying the compounds of which the orienting film and the conductive organic compound film were constructed as well as the method for forming these films. The type of compound for each film and the film forming method are shown in Table 3.

The compounds and the methods for constructing the orienting films were the same as in the conductive organic compound films in Examples 1 and 3 except that no charge-transfer complex was added. The compounds and the methods for constructing the conductive organic compound films were the same as in Examples 1, 3, and 4.

The thus fabricated liquid crystal elements were evaluated for contrast, optical bistability, and response time.

Contrast and Bistability

The measurement was the same as in Example 1 except that monopolar pulse voltage was applied across the elements. The monopolar pulses had a duration of 1 msec., a height of 20-30 volts, and a period of 40 times the pulse duration.

Response Time

The response time is a duration of time when the light transmittance varies from 10% to 90% upon application of a pulse voltage having a duration of 20 msec.

Table 3 shows the contrast and optical bistability of the liquid crystal elements along with their orienting films and conductive organic compound films.

Figure 5:
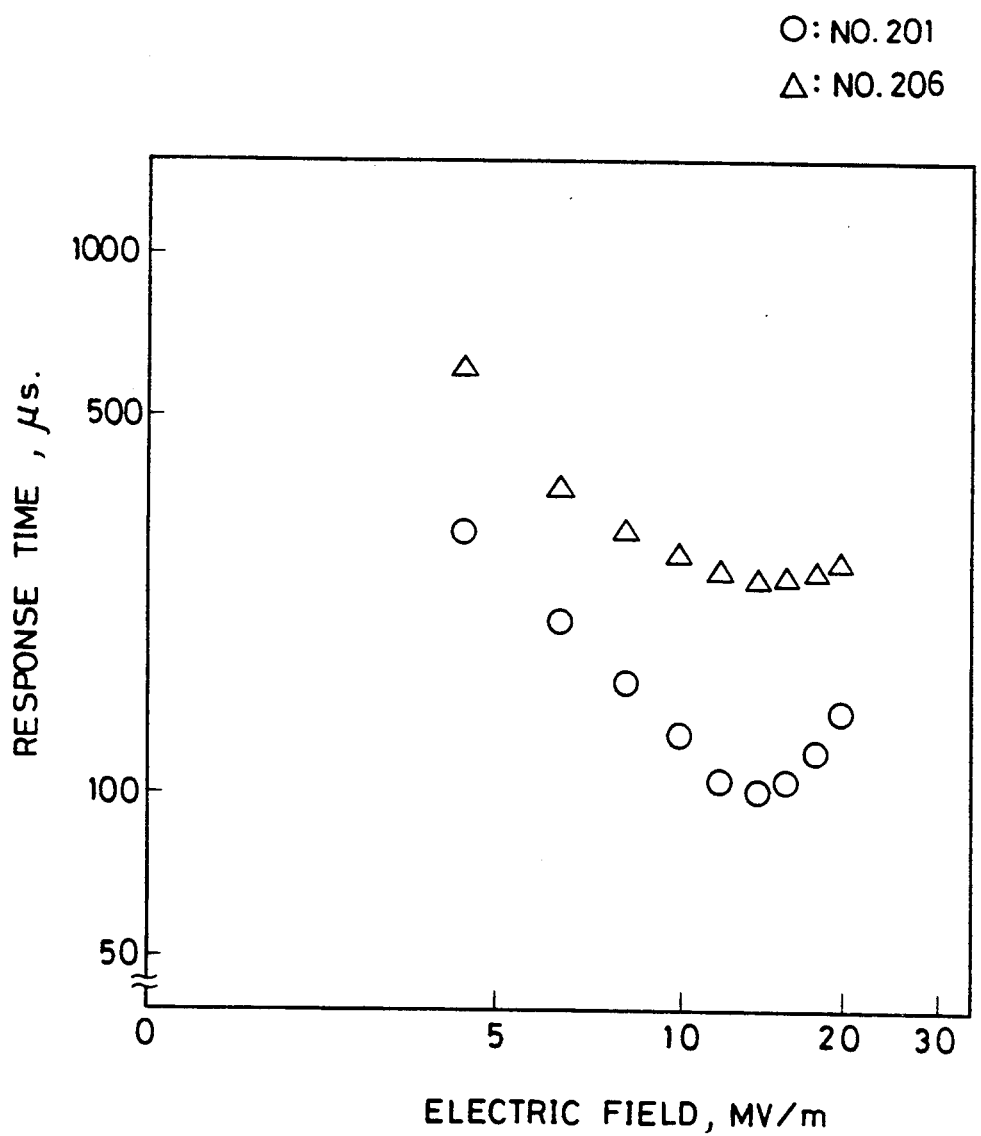

FIG. 5 shows the response time vs. applied electric field intensity of liquid crystal element No. 201. FIG. 5 also shows the response time vs. applied electric field intensity of liquid crystal element No. 206 of the same construction as No. 201 except that no charge-transfer complex was added.

In the preferred embodiment, the conductive organic compound film is composed of an orienting agent and a conductive agent both of organic compounds. The use of the conductive agent of organic nature ensures the compatibility between the conductive agent and the orienting agent, leading to sufficient mutual dispersion of the agents to form a uniform film. The film maintains very high uniformity and good display performance because the conductive organic compound does not electrically form secondary particles, as opposed to the use of conductive inorganic particles.

The content of conductive inorganic particles in a conductive film is limited since they are generally opaque. In contrast, the conductive organic compound is highly transparent as compared with the conductive inorganic particles, and the content of conductive organic compound in a film can be varied over a wide range for easy control of conductivity.

There are available only limited types of transparent conductive inorganic particles whereas numerous types of transparent conductive organic compounds are in supply. A wide range of choice for the conductive organic compound leads to a wide range of choice for the ferroelectric liquid crystal to be combined therewith, rendering the design of liquid crystal element relatively free for a particular purpose and application.

In particular, the conductive organic compound film containing a charge-transfer complex as the conductive material shows relatively low conductivity and hence, relatively high resistance for DC and low frequency power, but relatively high conductivity for high frequency power. The film shows low power losses for low frequency components and good conduction for high frequency components and thus ensures improved

TABLE 3

| Sample No. | Orienting film | | Conductive organic compound film | | Contrast | | Memory (%) |
| --- | --- | --- | --- | --- | --- | --- | --- |
| | Orienting agent | Formation | Compound | Formation | MCRo | MCRm | |
| 201 | polyimide | LB | CTC-3 | LB | 0.70 | 0.66 | 92 |
| 202 | polyimide | coating | metal phthalocyanine | coating | 0.60 | 0.57 | 93 |
| 203 | polyimide | coating | polypyrrole | vapor phase polymerization | 0.61 | 0.58 | 93 |
| 204 | polyimide | coating | polythiophene | electrolytic polymerization | 0.60 | 0.58 | 94 |
| 205* | polyimide | coating | — | — | 0.60 | 0.45 | 62 |
| 206* | polyimide | LB | — | — | 0.65 | 0.49 | 71 |

*comparison

As seen from the foregoing examples, the liquid crystal elements of the present invention have improved contrast and bistability and quick response.

There has been described a liquid crystal element comprising a pair of opposed substrates wherein a conductive organic compound film is present on the inside surface of at least one, preferably both of the opposed substrates and a ferroelectric liquid crystal is present between the opposed substrates. Provision of the conductive organic compound film on the substrate surface substantially prevents the polarization charge due to spontaneous polarization of the ferroelectric liquid crystal from accumulating between the liquid crystal and the substrate. This allows the liquid crystal element to offer satisfactory optical bistability, high contrast, and quick response. The effective life of the liquid crystal is extended because less charge will accumulate at the interface between the liquid crystal and the orienting film.

drive performance when applied to ferroelectric liquid crystal elements adapted for pulse voltage drive. The reason why the film containing charge-transfer complex causes low power losses for low frequency components is that not only hopping conduction commonly contemplated, but also high frequency polarization participate in the conduction mechanism.

In one preferred embodiment of the liquid crystal element of the invention wherein the conductive organic compound film is formed by the LB method, the film can be formed to an extremely reduced thickness to ensure high light transmittance and high contrast. Where the conductive organic compound film is formed by coating, there are advantages of quick response, high productivity and mass production. Where the conductive organic compound film is formed by vapor phase polymerization, a highly oriented film can be readily obtained. This embodiment also ensures a wide range of choice of monomer and freedom in design of the film. Where the conductive organic compound film is formed by electrolytic polymerization, the size and thickness of the film can be readily controlled in terms of the electrode area and conduction time. Since the reaction takes place in a single step, there are additional advantages of ease of operation and large scale manufacture.

In the preferred embodiment wherein an orienting film intervenes between the conductive organic compound film and the substrate, satisfactory orientation is accomplished even when a conductive organic compound having relatively low orientation is used. In addition, the upper limit of conductivity is raised to allow a wider range of choice for the conductive organic compound.

Where the orienting film is formed by the LB method, the film can be of an extremely reduced thickness, leading to improved light transmittance. Where the orienting film is formed by coating, there are advantages of high productivity and mass production.

Among the conductive organic compound films preferred are LB or coated films of polyimides, polyamides, and polyamide-imides containing charge-transfer complexes. When the conductive organic compound film and the orienting film are co-present, LB or coated films of polyimides, polyamides, and polyamide-imides are used as the orienting film and LB or coated films of charge-transfer complexes are used as the conductive organic compound film. Combinations of polyimides with charge-transfer complexes are most preferred.

Although some preferred embodiments have been described, many modifications and variations may be made thereto in the light of the above teachings. It is therefore to be understood that within the scope of the appended claims, the invention may be practiced otherwise than as specifically described.

We claim:

1. A liquid crystal element comprising a pair of opposed substrates, electrodes on the opposed surfaces of the substrates, and a liquid crystal disposed between the substrates in a sealed manner, characterized in that
   said liquid crystal is a ferroelectric liquid crystal, and
   a film comprising a conducting organic compound selected from the group consisting of charge-transfer materials, conjugated polymers, metal complexes and polymers having a metal complex in their backbone or side chain is formed on at least one of the opposed substrate surfaces and the electrode thereon.

2. The liquid crystal element of claim 1 wherein said film consists essentially of a conductive organic compound.

3. The liquid crystal element of claim 1 wherein said conductive organic compound is a charge-transfer material.

4. The liquid crystal element of claim 1 wherein said conductive organic compound film is formed by a Langmuir Blodgett method.

5. The liquid crystal element of claim 1 wherein said conductive organic compound film is formed by coating.

6. The liquid crystal element of claim 1 wherein said conductive organic compound film is formed by vapor phase polymerization.

7. The liquid crystal element of claim 1 wherein said conductive organic compound film is formed by electrolytic polymerization.

8. The liquid crystal element of claim 1 wherein said conductive organic compound film further comprises an orienting agent.

9. The liquid crystal element of claim 1 which further comprises an orienting film containing an orienting agent between said conductive organic compound film and the substrate.

10. The liquid crystal element of claim 8 or 9 wherein said orienting agent is selected from the group consisting of polyimides, polyamides, and polyamide-imides.

* * * * *